United States Patent
Wu

(10) Patent No.: US 11,893,434 B2
(45) Date of Patent: Feb. 6, 2024

(54) CIRCUIT AND METHOD OF IMPROVING ENERGY HARVESTING FOR RADIO FREQUENCY IDENTIFICATION (RFID) TAG WITH TEMPERATURE SENSOR

(71) Applicant: EXCELIO TECHNOLOGY (SHENZHEN) CO., LTD., Shenzhen (CN)

(72) Inventor: Patrick Bian Wu, Shenzhen (CN)

(73) Assignee: EXCELIO TECHNOLOGY (SHENZHEN) CO., LTD., Shenzhen (CN)

( * ) Notice: Subject to any disclaimer, the term of this patent is extended or adjusted under 35 U.S.C. 154(b) by 413 days.

(21) Appl. No.: 17/376,399

(22) Filed: Jul. 15, 2021

(65) Prior Publication Data
US 2021/0342660 A1   Nov. 4, 2021

Related U.S. Application Data

(63) Continuation of application No. PCT/CN2020/071256, filed on Jan. 9, 2020.

(30) Foreign Application Priority Data

Jan. 17, 2019 (CN) .......................... 201910045575.8

(51) Int. Cl.
G06K 19/07 (2006.01)
(52) U.S. Cl.
CPC ..... G06K 19/0709 (2013.01); G06K 19/0717 (2013.01); G06K 19/0723 (2013.01)
(58) Field of Classification Search
CPC ........... G06K 19/0709; G06K 19/0717; G06K 19/0723; G06K 19/0704; G06K 19/0713; G06K 19/0715
See application file for complete search history.

(56) References Cited

U.S. PATENT DOCUMENTS 4,656,463 A * 4/1987 Anders .................... G01S 13/78
340/541
5,214,409 A * 5/1993 Beigel .................. A01K 11/006
340/10.52
(Continued)

FOREIGN PATENT DOCUMENTS

CN     104156757 A    11/2014
CN     104834955 A     8/2015
(Continued)

OTHER PUBLICATIONS

World Intellectual Property Organization (WIPO) International Search Report for PCT/CN2020/071256 dated May 14, 2020 6 pages.

Primary Examiner — Curtis J King
(74) Attorney, Agent, or Firm — ANOVA LAW GROUP, PLLC

(57) ABSTRACT

The present disclosure provides a circuit and a method for improving energy harvest for an RFID tag with a temperature sensor, where an instruction command sent by a card reader includes a modulated part to invoke temperature sensor functions, and an unmodulated constant-envelop RF signal part with an extended time of duration to charge a switched additional energy storage capacitor embedded in the circuit. The switched additional energy storage capacitor is connected to the circuit upon a mode control signal corresponding to the sensor operation mode of the RFID tag. Thus, the RFID tag with the temperature sensor is ensured to conform to the timing window protocol for regular downlink operations, and at the same time, is capable of meeting higher energy demand for a high accuracy temperature sensor operation.

16 Claims, 1 Drawing Sheet

(56) References Cited

U.S. PATENT DOCUMENTS

| | | | | | |
|---|---|---|---|---|---|
| 5,257,011 | A | * | 10/1993 | Beigel | G06K 7/0008 340/572.1 |
| 5,499,017 | A | * | 3/1996 | Beigel | G06K 19/0723 340/572.1 |
| 5,521,590 | A | * | 5/1996 | Hanaoka | G06K 19/0723 340/10.51 |
| 5,721,535 | A | * | 2/1998 | Ikefuji | G06K 19/0723 342/42 |
| 5,945,920 | A | * | 8/1999 | Maletsky | G06K 19/0701 340/5.74 |
| 6,712,276 | B1 | * | 3/2004 | Abali | G06K 19/0717 235/492 |
| 6,806,808 | B1 | * | 10/2004 | Watters | G01D 5/48 340/3.3 |
| 7,187,299 | B2 | * | 3/2007 | Kunerth | G01M 11/30 340/539.22 |
| 7,611,066 | B2 | * | 11/2009 | Shyu | H03D 1/10 340/572.1 |
| 7,994,923 | B2 | * | 8/2011 | Watanabe | G06K 19/0723 455/66.1 |
| 8,013,714 | B2 | * | 9/2011 | Qi | G06K 19/0723 380/37 |
| 8,395,485 | B2 | * | 3/2013 | Wuidart | G06K 7/10158 340/572.5 |
| 8,502,675 | B2 | * | 8/2013 | Hamel | G06K 7/10019 340/572.1 |
| 8,643,470 | B2 | * | 2/2014 | Toriyama | G06K 19/0723 235/487 |
| 8,702,008 | B2 | * | 4/2014 | Springer | G06K 19/0701 235/492 |
| 8,798,533 | B2 | * | 8/2014 | Wuidart | G06K 19/0723 340/572.5 |
| 8,988,196 | B2 | * | 3/2015 | Wuidart | G06K 19/0723 340/10.3 |
| 9,342,775 | B2 | * | 5/2016 | Forster | G06K 19/0726 |
| 10,360,488 | B2 | * | 7/2019 | Lewis | G06K 19/0717 |
| 10,931,148 | B2 | * | 2/2021 | Haas | H02J 50/20 |
| 2003/0003870 | A1 | * | 1/2003 | Cernusca | G06K 19/0726 455/252.1 |
| 2004/0008112 | A1 | * | 1/2004 | Carrender | G05D 23/24 340/539.26 |
| 2004/0036626 | A1 | * | 2/2004 | Chan | G06K 19/0717 374/E1.004 |
| 2004/0046016 | A1 | * | 3/2004 | Becker | G06K 7/0008 235/380 |
| 2005/0093374 | A1 | * | 5/2005 | Connors | G06K 19/0705 307/126 |
| 2005/0186904 | A1 | * | 8/2005 | Kowalski | G06K 19/07786 455/66.1 |
| 2006/0103535 | A1 | * | 5/2006 | Pahlaven | G06K 7/10306 340/572.1 |
| 2006/0132302 | A1 | * | 6/2006 | Stilp | G08B 25/009 340/10.5 |
| 2007/0018794 | A1 | * | 1/2007 | Bares | G06K 19/0705 340/10.3 |
| 2007/0018832 | A1 | * | 1/2007 | Beigel | G06K 19/07762 340/572.7 |
| 2007/0096875 | A1 | * | 5/2007 | Waterhouse | G06K 19/07749 340/572.1 |
| 2007/0176753 | A1 | * | 8/2007 | Amtmann | G06K 19/0701 455/41.1 |
| 2007/0215709 | A1 | * | 9/2007 | Baude | G06K 19/0723 235/492 |
| 2008/0136646 | A1 | * | 6/2008 | Friedrich | G06K 7/0095 340/572.7 |
| 2008/0272890 | A1 | * | 11/2008 | Nitzan | H01Q 9/16 340/10.1 |
| 2009/0121835 | A1 | * | 5/2009 | Borret | G06K 7/10237 455/41.1 |
| 2009/0261953 | A1 | * | 10/2009 | Kang | G06K 19/0716 340/10.4 |
| 2010/0060456 | A1 | * | 3/2010 | Forster | G06K 19/0702 340/572.1 |
| 2010/0117796 | A1 | * | 5/2010 | Claessen | G06K 19/0723 340/10.1 |
| 2010/0295682 | A1 | * | 11/2010 | August | G08B 13/242 340/572.7 |
| 2011/0291807 | A1 | * | 12/2011 | Law | G06K 19/0723 374/178 |
| 2012/0194322 | A1 | * | 8/2012 | Batra | G06K 19/0723 340/10.33 |
| 2012/0241524 | A1 | * | 9/2012 | Blot | G06K 7/10128 235/492 |
| 2016/0048709 | A1 | * | 2/2016 | Butler | H01Q 9/285 340/10.51 |
| 2016/0048712 | A1 | * | 2/2016 | Butler | G06K 7/10198 340/10.51 |
| 2016/0352121 | A1 | * | 12/2016 | Yuyama | G06K 19/0709 |
| 2017/0248475 | A1 | * | 8/2017 | Bonifas | G01N 25/18 |
| 2018/0123774 | A1 | * | 5/2018 | Kanda | G06K 19/0723 |
| 2019/0258833 | A1 | * | 8/2019 | Caselli | G06K 7/10148 |
| 2020/0220736 | A1 | * | 7/2020 | Subramanian | H04L 9/3252 |
| 2021/0390273 | A1 | * | 12/2021 | Niu | G06K 19/0716 |
| 2022/0309307 | A1 | * | 9/2022 | Ghannam | G06K 7/10099 |

FOREIGN PATENT DOCUMENTS

| | | |
|---|---|---|
| CN | 105160387 A | 12/2015 |
| CN | 104156757 B | 4/2017 |
| CN | 105160387 B | 1/2018 |
| CN | 108063496 A | 5/2018 |
| CN | 109766980 A | 5/2019 |
| CN | 108063496 B | 6/2020 |

* cited by examiner

CIRCUIT AND METHOD OF IMPROVING ENERGY HARVESTING FOR RADIO FREQUENCY IDENTIFICATION (RFID) TAG WITH TEMPERATURE SENSOR

CROSS-REFERENCE TO RELATED APPLICATION

This application is a continuation of International Application No. PCT/CN2020/071256, filed on Jan. 9, 2020, which claims priority of Chinese Patent Application CN201910045575.8, filed on Jan. 17, 2019, the entire contents of which are incorporated herein by reference.

TECHNICAL FIELD

The present disclosure relates to the technical field of semiconductor integrated circuit design and, more particularly, to a circuit and a method of improving energy harvesting for an RFID tag with a temperature sensor.

BACKGROUND

In today's application field of Internet of Things (IoT) with all things ubiquitously connected, wireless sensor tags combine functions of information sensing, measurement, and radio frequency communication together to facilitate implementation of sensor nodes in a wireless sensor network. In one example, in an application scenario of an industrial warehouse or a vegetable growing greenhouse, supporting columns or a steel frame structure of a building may be equipped with sensor devices to monitor an ambient temperature and humidity, and a level of air pollution. After tasks of measurement and result saving are completed, data may be uploaded to a monitoring server through a wireless local area network (i.e., WiFi) or a low-power wide area network (i.e., LP-WAN) for obtaining ambient monitoring data. In another example, in an application scenario of intelligent industrial manufacturing, a finished product on a production line for finished product packaging is attached with a sensor device including an identification number, a weight, and a temperature of each finished product. When the finished product passes through a certain detection and retrieval device on the production line, information of the finished product is uploaded to a host system through a communication method such as WiFi, Zigbee, or NB-IoT, thereby achieving functions such as product counting and product information recording, and even functions such as quality inspection and monitoring. In a more advanced application scenario of mobile medical service and remote health industries, when a patient under care orally takes a medical monitoring sensor or sticks the medical monitoring sensor to the patient's body, patient's blood pressure, pulses, heartbeat, and body temperature are measured and saved into the storage of the sensor. The sensor then uploads the data to a diagnostic or care monitoring center through a communication method such as a remote GPRS communication method or a local Zigbee communication method. Thus, the patient's health conditions are monitored in real-time.

Undoubtedly, in the above application scenarios, the IoT, as an innovative technology breakthrough, enables sensors to be wirelessly connected to a monitoring system, which can substantially reduce an implementation cost of an application solution. Compared to wired connection of the sensors, the wireless connection has greater application prospects. As a fundamental technology for the IoT, a radio frequency identification (RFID) tag has been widely used in many aspects of social life. Further, near field communication (NFC) derived from 13.56 MHz radio frequency identification frequency band has also been widely adopted because it is often integrated into mobile phones. The RFID tag often includes an RFID chip and one or more discrete components such as an inductor and a capacitor. In the specification, the RFID tag and RFID chip are interchangeably when the difference is not relevant under the context. In various RFID tag technologies, passive RFID tag technology is a primary choice for wireless sensor network because surrounding magnetic fields are induced and converted into electric energy to power operation of circuits in an RFID chip without the need for a battery, which further reduces solution cost. It is technically challenging to integrate the RFID chip and a sensor into a single chip.

A first challenge is low power consumption circuit design. As the name suggests, the passive RFID tag has neither external power supply nor internal battery supply. The electric energy required for operating the passive RFID tag is derived from an alternate current (AC) magnetic field induced by an inductor coil from the surrounding magnetic field. The AC magnetic field is converted by a rectifier and regulator circuit inside the RFID chip into a DC power source to provide power for operating the entire RFID chip. Depending on an electric current required to operate the RFID chip and a time period for the RFID chip to continue to operate after the surrounding magnetic field is turn off, an external energy storage capacitor may or may not be needed. When being connected, the external energy storage capacitor is charged when the surrounding magnetic field is coupled into the inductor coil connected to the RFID chip. That is, the electric current charges the external energy storage capacitor. After the surrounding magnetic field is completely turned off, an electric charge stored in the external energy storage capacitor begins to be discharged to the RFID chip to act like a power supply. That is, the electric current is discharged out of the external energy storage capacitor.

In an RFID communication method, such as a full duplex communication in a low-frequency RFID tag, the surrounding magnetic field is not completely turned off. A card reader device (hereinafter card reader) and the RFID chip both use either an amplitude modulation or a simpler binary on-off shift keying modulation. When a modulated signal is transmitted (e.g., transmitting "1"), a voltage at the inductor coil is pulled down to a low level to distinguish from non-modulated signal transmission. That is, when the voltage at the inductor coil is not pulled down to the low level, the non-modulated signal is transmitted (e.g., transmitting "0"). In this case, the electric current is discharged from the inductor coil to complete the modulation operation, and the stored electric charge is less compared with no modulated signal transmission. When an energy storage capacitor is not connected, it is likely that the power supply is insufficient to operate the entire RFID chip. The above-described power supply mode, which derives electric power from the surrounding magnetic field and has the derived electric power rectified and regulated, determines a minimum threshold of the power level to operate the circuits of the entire RFID chip. Below the minimum threshold, operations such as RFID downlink demodulation and uplink response over a certain communication distance may not be possible. Under this restriction, on the other hand, the sensor needs to accurately measure a physical parameter and then converts the measured physical parameter from an analog form to a digital form suitable for digital communication, that is, an analog-to-digital conversion or an A/D conversion. As such, both steps need to be performed with minimum power consumption.

It is well known that the physical parameter measured by the sensor is often a weak signal. Processing and amplifying the weak signal need to overcome device noise, common mode noise (e.g., power supply fluctuation and ground noise), and differential mode mismatch. In conventional circuits, relatively large current and power consumption are required to achieve these goals. On the other hand, tracking changes of a sensor signal requires a signal processing circuit to have a higher bandwidth than the sensor signal's frequency. The higher bandwidth leads to a larger current and a larger system power consumption. Similarly, the analog-to-digital conversion requires considerations for a signal-to-noise ratio, a common mode rejection ratio, a power supply voltage rejection ratio, and signal processing bandwidth. Based on same operation principle and inference, accurate A/D conversion also consumes more electric current and system power. This is a well-known dilemma for the low-power consumption circuit design. Such challenge makes it difficult to integrate the sensor with the passive RFID chip, which is a problem that needs to be solved for the electronics industry.

A second challenge is application mode compatibility. As previously described, connecting the external energy storage capacitor may help balance to a certain degree between limitation of the low-power consumption circuit design and an energy level required for sophisticated sensing and RFID communication functions. When the RFID chip powers up, the electric energy derived from the surrounding magnetic field is rectified and regulated to obtain the electric current to charge the energy storage capacitor. During a charging process, as the electric charge of the energy storage capacitor increases, a voltage across the energy storage capacitor rises accordingly. The larger the capacitance of the energy storage capacitor, the slower the voltage rises to reach a certain level.

The communication protocol of the RFID chip often has a timing requirement for a power-on start-up time. For example, the international low frequency animal identification standards ISO 11784/11785 includes two operation modes for the animal identification radio frequency tag, that is, a downlink command mode and an uplink response mode.

The downlink command mode is also called a "reader talk first" mode or an RTF mode, which refers to a mode in which the card reader actively sends an operation command and drives the RFID chip to respond according to the operation command. For example, the card reader sends the operation command to read a content of a data storage unit at a certain memory address. After receiving the operation command, the RFID chip reads the content of the data storage memory unit at the memory address according to the operation command, and a radio frequency front end passively sends a response signal through a load modulator circuit, that is, a digital code stream including data content. The uplink response mode is also called a "tag talk fist" mode or a TTF mode, which refers to that without receiving any operation command from the card reader, the RFID chip enters a mode in which the load modulator circuit automatically and repeatedly sends a certain fixed code stream. The fixed code stream often includes user information such as a tag serial number.

After the RFID tag obtains the electrical energy through magnetic field coupling and powers up, the air interface specification in the ISO 11784 protocol determines whether the system enters the uplink response mode or the downlink command mode. In the specification, after the RFID tag detects a sufficient electric energy level and sends a power-on reset signal, the RFID chip waits for the operation command sent by the card reader within a certain time window (e.g., 4 ms). Once the RFID chip receives and correctly demodulates the operation command supported by the RFID chip, the RFID chip enters the downlink command mode. The RFID chip acts and responds according to the operation command. Otherwise, if within the certain time window after the power-on reset, the RFID chip receives no operation command sent by the card reader or is unable to correctly demodulate any operation command supported by the RFID chip due to communication errors, the RFID chip enters the uplink response mode. In the uplink response mode, the RFID chip repeatedly sends data at the fixed memory address (i.e., the fixed code stream) to the card reader through the load modulator circuit. Thus, the time window is an important parameter specified in the standard communication protocol to support the RTF mode and the TTF mode. Connecting the energy storage capacitor to harvest more electric energy required for operating the RFID chip with an integrated temperature sensor may take an overly long time for the voltage cross the energy storage capacitor to rise, and the RFID chip may automatically enter the uplink response mode and may be unable to process any operation command in the RTF mode (i.e., more advanced operation command or RTF command). This incompatibility of the RFID tag causes a large number of existing card readers unable to use the RTF command on the RFID tag due to the non-compliance to the standard communication protocol. If the time window in the RTF mode is extended long enough to satisfy the requirement for powering the sensor, a large number of the existing card readers currently in use and complying with the existing communication protocol may have to be replaced, thereby incurring substantial cost to users. Such approach is economically infeasible and technically unfavorable for large-scale adoption.

Therefore, integrating the sensor and the RFID chip into a single chip is technically challenging. Currently, there has been no feasible technical solutions to address this growing need for the IoT industry.

Take the agricultural IoT field by the animal identification standard ISO 11784/11785 as an example. Both high-end livestock breeding and household pet breeding have to monitor health signs of livestock or pet animals. As an important vital sign, a body temperature is of primary concern. The technical difficulties described above make it difficult for the RFID chip with the integrated sensor to satisfy user requirements in communication distance and application scenarios.

The present disclosure provides a method for integrating the RFID chip with the temperature sensor. The method is not limited to solving the problem of integrating the RFID chip with the temperature sensor. The method may be applied to integrating the RFID chip with various types of sensors. The method may be used to solve the problem of operating the RFID chip in two modes with substantially different power consumptions.

The present disclosure defines a temperature measurement operation in the RFID chip with the integrated temperature sensor is an operation in the downlink command mode while an operation in the uplink response mode only involves uploading the fixed code stream through the load modulator circuit and does not involve any advanced operation such as temperature measurement and A/D conversion. Therefore, a system architecture and a circuit design of the RFID chip are improved to achieve an accurate temperature measurement. The objective is to provide more electrical energy to the RFID chip. It is different from the approach in which a charging time for energy coupling by the card reader is simply extended to increase the electric charge to the energy storage capacitor connected to the RFID chip. Extending the charging time for the card reader to charge the RFID chip may take up too much time in the time window in the power-on procedure, resulting in the RFID chip automatically entering the uplink response mode and making the RTF downlink command mode inoperable.

SUMMARY

One aspect of the present disclosure includes a circuit for a passive radio frequency identification (RFID) tag with a temperature sensor. The circuit includes: a resonance inductor and a resonance capacitor connected in parallel for coupling an external magnetic field; a clock recovery circuit; a rectifier circuit; a regulator circuit; a command demodulation circuit; a load modulator circuit; a bandgap reference circuit; a power-on reset circuit; an embedded memory module; other RFID tag circuits including a state machine control circuit, an energy level detection and limiting control circuit, a mode conversion circuit, and a reference voltage and bias current circuit; a first energy storage capacitor; a control circuit for RFID tag/sensor mode conversion; and a switch transistor. A positive terminal and a negative terminal of the resonance capacitor are respectively connected to two input terminals of each of the clock recovery circuit, the rectifier circuit, the command demodulation circuit, and the load modulator circuit; an output terminal of the rectifier circuit is connected to an input terminal of the regulator circuit; and an output terminal of the regulator circuit is respectively connected to each of the bandgap reference circuit, the power-on reset circuit, the embedded memory module, the other RFID tag circuits, and the first energy storage capacitor. An output terminal of the command demodulation circuit is connected to the control circuit for the RFID tag/sensor mode conversion and is configured to demodulate information from an alternate current (AC) signal sent by a card reader to receive a command from the card reader, the command including a command for regular operations of an RFID chip under an RFID tag mode unrelated to the temperature sensor and a command for starting the temperature sensor under a temperature sensor mode sent by the card reader to the RFID tag including the temperature sensor. The control circuit for the RFID tag/sensor mode conversion is configured to control and configure the RFID tag according to the command from the card reader demodulated by the command demodulation circuit. In response to the command containing the command for starting the temperature sensor, the control circuit for the RFID tag/sensor mode conversion enters the temperature sensor mode, and outputs a voltage to a gate terminal of a switch transistor to make conduction between a source terminal and a drain terminal of the switch transistor.

Another aspect of the present disclosure provides a method for a passive radio frequency identification (RFID) tag with a temperature sensor. The method includes: sending, by a card reader, a magnetic field to the passive RFID tag, where an inductor coil of the passive RFID tag couples the magnetic field to generate an induced current to power up the passive RFID tag to enter an operation state; sending, by the card reader, a command to the passive RFID tag, where after a command demodulation circuit of the passive RFID tag parses the command, a control circuit for the RFID tag/sensor mode conversion of the passive RFID tag controls relevant circuits of the passive RFID tag to start operation, and transmits relevant data upstream to the card reader; and when the command sent by the card reader includes a command to start the temperature sensor, the control circuit for the RFID tag/sensor mode conversion switches to a temperature sensor mode, and outputs a voltage to a gate terminal of a switch transistor to make conduction between a source terminal and a drain terminal of the switch transistor; an electric charge outputted by a regulator circuit of the passive RFID tag supplies to other RFID tag circuits and a temperature measurement and A/D conversion circuit, and at the same time, charges a first energy storage capacitor and a second energy storage capacitor, the other RFID tag circuits including a state machine control circuit, an energy level detection and limiting control circuit, a mode conversion circuit, and a reference voltage and bias current circuit; and when the card reader stops sending the magnetic field to the passive RFID tag, or the magnetic field sent by the card reader becomes weak, discharging, by the first energy storage capacitor and the second energy storage capacitor, to supply power to the other RFID tag circuits and the temperature measurement and A/D conversion circuit to keep them in the operation state to perform the temperature measurement, A/D conversion, and other tasks, such that the amount of supplied energy is ensured for the RFID tag to perform the temperature measurement, the accuracy of the temperature measurement by the RFID tag is ensured, and a communication distance of the RFID tag is also ensured.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts.

DETAILED DESCRIPTION OF THE EMBODIMENTS

Technical solutions in the embodiments of the present disclosure will be clearly and completely described below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure. In addition, under circumstances of no conflict, the following embodiments and features in the embodiments may be combined with each other.

Figure 1:
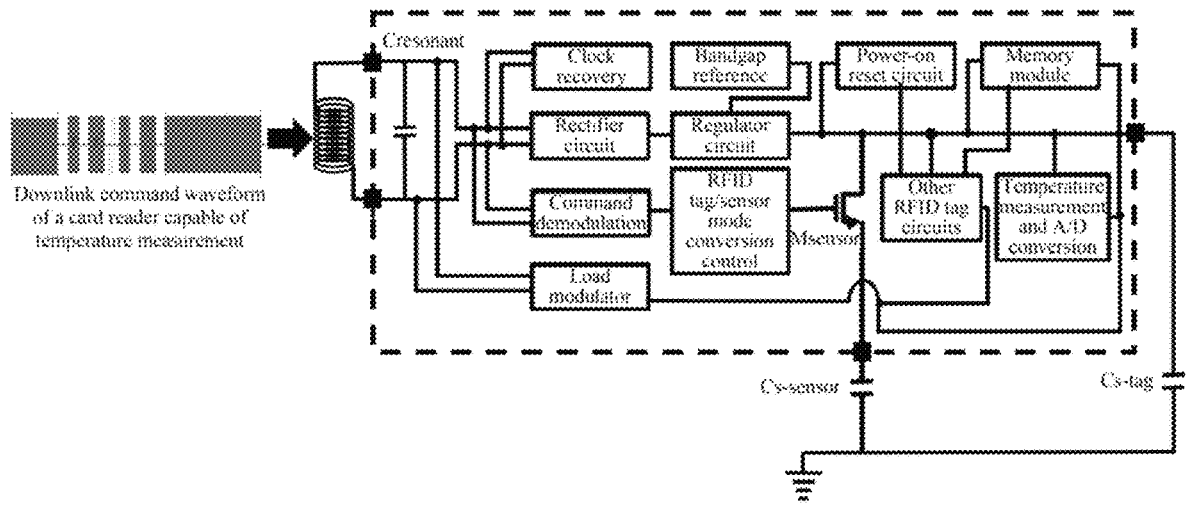
FIG. 1 illustrates a schematic structural block diagram of an exemplary passive RFID tag with an integrated temperature sensor according to some embodiments of the present disclosure.

FIG. 1 illustrates a schematic structural block diagram of an exemplary passive RFID tag with an integrated temperature sensor according to some embodiments of the present disclosure. As shown in FIG. 1, the passive RFID tag includes an RFID chip with the integrated temperature sensor enclosed in dashed lines. In the specification, RFID tag and passive RFID tag are interchangeably because the RFID tag is always the passive RFID tag. The RFID tag includes a resonance inductor and resonance capacitor (i.e., Cresonance) connected in parallel for coupling an external magnetic field. A negative terminal and a positive terminal of the resonance capacitor Cresonance are respectively connected to two inputs of each of a clock recovery circuit, a rectifier circuit, a command demodulation circuit, and a load modulator circuit. An output terminal of the rectifier circuit is connected to an input terminal of the regulator circuit. An output terminal of the regulator circuit is connected to a bandgap reference circuit, a power-on reset circuit, other RFID tag circuits, and a first energy storage capacitor Cs-tag. Functions of each of the aforementioned circuits are described below.

The resonance inductor is a component externally connected to an RFID chip and is coupled with the resonance capacitor to form a resonance circuit, configured to couple and convert magnetic field energy emitted by a card reader into an alternate current (AC) signal.

The resonance capacitor is internal to the RFID chip and is part of the resonance circuit. The resonance capacitor and the resonance inductor together form the resonance circuit, configured to harvest the magnetic field energy emitted by the card reader.

The clock recovery circuit is configured to extract a square-wave clock signal from an AC voltage outputted by the resonance circuit. The square-wave clock frequency is the same as a clock frequency of the magnetic wave signal emitted by the card reader. The square-wave clock signal is provided to digital control logics internal to the RFID chip as a synchronization signal.

The bandgap reference circuit is configured to provide a temperature-independent reference voltage and a bias current to the digital control logics internal to the RFID chip.

The power-on reset circuit is configured to monitor an amount of energy harvested by the RFID chip. Once a sufficient amount of energy is harvested by the RFID chip in a power-on process, the power-on reset circuit sends a reset signal to the digital control logics inside the RFID chip.

The memory module is a non-volatile memory. A read command, an erase command, and a write command are used to read data from the non-volatile memory, to erase data from the non-volatile memory, and to write data into the non-volatile memory, respectively.

The rectifier circuit is configured to use a plurality of unidirectional threshold devices to convert received AC signal to a DC signal, resulting in a DC voltage to be supplied to remaining circuits of the RFID chip.

The regulator circuit is configured to suppress ripples of the DC voltage outputted by the rectifier circuit with respect to the temperature-independent reference voltage. The rectifier circuit and the regulator circuit together provide the DC power supply to the RFID chip.

The load modulator circuit is configured to control transmitting information upstream from the RFID chip to the card reader. The load modulator circuit changes an equivalent impedance of the resonance circuit according to the digital code stream to be transmitted, thereby modulating the information to a resonance signal of the resonance circuit and then transmitting the modulated resonance signal upstream to the card reader through the magnetic field coupling.

The other RFID tag circuits include a state machine control circuit (or state machine control logic circuit), an energy level detection and limiting control circuit, a mode conversion circuit, and a reference voltage and bias current circuit. The other RFID tag circuits provide additional functions to the RFID chip with the integrated temperature sensor, such as controlling timing for switching between the TTF mode and the RTF mode, e.g., by the state machine control circuit, controlling amplitude limiting and adjustment at an energy harvesting front-end circuit, e.g., by the energy level detection and limiting control circuit, controlling the output voltage of the dynamically regulated power supply, e.g., by the reference voltage and bias current circuit, and generating and amplitude limiting a high voltage required by programming operations of writing and erasing data in the memory module, e.g., by the mode conversion circuit. The other RFID tag circuits are included to adjust and control the performance of the RFID tag in the existing technology. They are not directly related to the embodiments of the present disclosure, and the detail description thereof is omitted.

The first energy storage capacitor Cs-tag may be a capacitor externally connected or internally built-in to the RFID chip depending on power consumption requirement of the RFID chip. In certain designs, Cs-tag is not externally connected and is included in the RFID chip. In some other designs, the externally connected capacitor Cs-tag is required to supply extra power. For example, when the card reader is absent for an extended period of time, the external energy storage capacitor may still be able to supply power to the RFID chip during the extended period of time.

The command demodulation circuit receives the information downstream from the card reader through parsing a modulated command signal. An output terminal of the command demodulation circuit is connected to a control circuit (or control logic circuit) for mode conversion between an RFID tag mode and a temperature sensor mode (also referred to as "RFID tag/sensor mode conversion control"). The command demodulation circuit is configured to demodulate the information transmitted from the card reader from the AC signal to obtain the command of the card reader. The command includes a command for regular operations of the RFID chip unrelated to the temperature sensor and a command for starting the temperature sensor sent from the card reader to the RFID tag. Based on the command from the card reader demodulated by the command demodulation circuit, the control circuit for the RFID tag/sensor mode conversion controls and configures the RFID tag. For example, when the command is to start the temperature sensor, the control circuit for the RFID tag/sensor mode conversion switches to the temperature sensor mode and outputs a voltage to a gate terminal of a switch transistor Msensor to make conduction between a source terminal and a drain terminal of the switch transistor Msensor.

The gate terminal of the switch transistor Msensor is connected to an output terminal of the control circuit for the RFID tag/sensor mode conversion. The drain terminal is connected to the output terminal of the regulator circuit. The source terminal is connected to the ground through a second energy storage capacitor Cs-sensor. As such, the second energy storage capacitor Cs-sensor is connected through the switch transistor Msensor into the RFID chip to provide extra energy supply to the temperature measurement and A/D conversion circuits.

The switch transistor Msensor may be a switch device or a compound switch. An input terminal of the switch device or the compound switch is connected to the output terminal of the regulator circuit. An output terminal of the switch device or the compound switch is connected to the ground through the second energy storage capacitor Cs-sensor. A control terminal of the switch device or the compound switch is connected to the output terminal of the control circuit for the RFID tag/sensor mode conversion.

A positive terminal of the second energy storage capacitor Cs-sensor is connected to the source terminal of the switch transistor Msensor. A negative terminal of the second energy storage capacitor Cs-sensor is connected to the ground through the first energy storage capacitor Cs-tag. The second energy storage capacitor Cs-sensor is configured to supply power to the temperature measurement and A/D conversion circuit in the temperature sensor mode (i.e., a high power consumption mode) to allow the temperature measurement and A/D conversion circuit to accurately measure the temperature and to convert the analog temperature measurement to the digital temperature measurement with a high precision. The temperature sensor mode includes, but is not limited to, a card reader magnetic field off mode and the temperature measurement and A/D conversion mode.

One terminal of the temperature measurement and A/D conversion circuit is connected to the output terminal of the regulator circuit and the drain terminal of the switch transistor Msensor, and is further connected to the second energy storage capacitor Cs-sensor through the switch transistor Msensor. Another terminal is connected to an output terminal of the load modulator circuit and the memory module. The temperature measurement and A/D conversion circuit is configured to accurately measure the temperature according to the command from the card reader and to convert the analog measurement to the digital measurement to form the digital code stream representing the temperature. For the implementation of the temperature measure and A/D conversion circuit, reference can be made to any temperature sensor in the industry.

In the embodiments of the present disclosure, the card reader command for starting the temperature sensor includes a code-modulated command part and a not code-modulated radio frequency signal part for extending a charging time. A switched energy storage capacitor is added to a circuit system architecture. An operation mode of the sensor controls a starting logic signal to determine whether the switched energy storage capacitor is connected. Thus, the RFID tag with the integrated high-precision temperature sensor accommodates the limitation of the response time window protocol of the downlink command mode and the high power consumption requirement in the operation of the high-precision temperature sensor, making the integration of the passive RFID chip and the temperature sensor feasible. The same approach may also be extended to the integration of another high power consumption sensor and the passive RFID chip. The present disclosure is widely applicable to many use cases and will play an important role in the lower-power IoT wireless sensor networking. The circuit design of the present disclosure facilitates harvesting more energy to support the temperature measurement and the A/D conversion circuit and substantially improves the performance. For example, regarding the aforementioned technical challenges and unresolved dilemma in the lower-power consumption circuit design, a front-end pre-amplifier for processing weak signals may have relatively high gain, more desired noise suppression performance, more desired power supply voltage ripple rejection ratio, and wider signal processing bandwidth. An A/D conversion circuit may also have more stable reference voltage, higher sign-to-noise ratio, higher power supply voltage ripple rejection ratio, and higher common-mode rejection ratio, thereby achieving higher conversion accuracy.

As shown in FIG. 1, the present disclosure includes a command part and a circuit part. The command part refers to that the card reader communicating with the RFID tag with the integrated temperature sensor sends the command for starting the temperature sensor to the RFID tag in the form of magnetic field energy. The circuit part refers to the design approach that the RFID tag with the integrated temperature sensor includes the circuit design and component arrangement to solve the problems described in the background section.

The command part includes three sub-parts. The first sub-part includes the command for regular operations unrelated to the temperature sensor, which is configured to control the RFID tag to perform tasks other than the temperature measurement.

Figure 2:
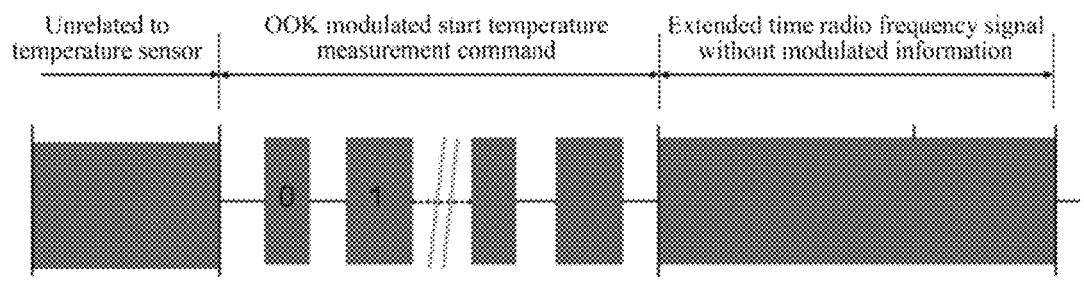
FIG. 2 illustrates an OOK modulated waveform of an exemplary temperature sensor command of a card reader according to some embodiments of the present disclosure.
Figure 3:
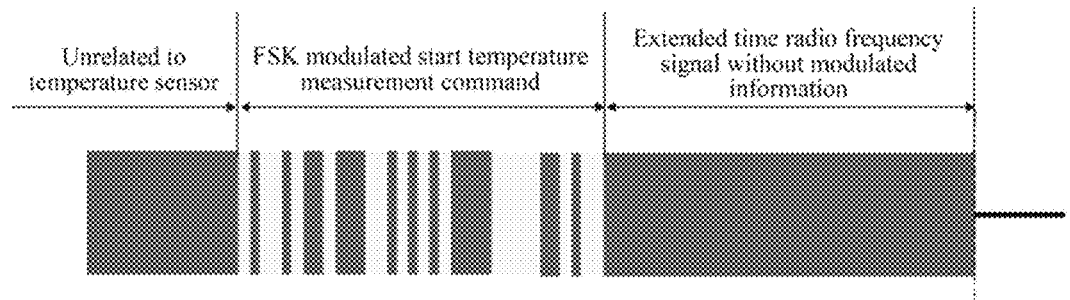
FIG. 3 illustrates an FSK modulated waveform of an exemplary temperature sensor command of a card reader according to some embodiments of the present disclosure.

The second sub-part includes the command for starting the temperature sensor by activating the temperature measurement and A/D conversion circuit in the RFID chip. The modulation method and the coding method allow the radio frequency receiver circuit and the command demodulation circuit to obtain the information in the command sent by the card reader for starting measuring the temperature, such that the RFID tag enters the temperature sensor mode (i.e., a high-precision high-power consumption mode) for temperature sensing. A modulation format of the command signal includes a general-purpose modulation format, including, but not limited to, an on-off keying (OOK) modulation method shown in FIG. 2 and a frequency shift keying (FSK) shown in FIG. 3. The specific coding method for the modulation methods is not specified here and any suitable coding method in the communication industry may be used within the scope of the present disclosure.

The third sub-part includes an extended time radio frequency signal without modulated information. The main feature of the third sub-part is that the radio frequency signal includes a stabilized amplitude and a smooth envelope for a period of time, that is, the magnetic field maintains a constant amplitude, for example, a horizontal envelope. The objective is to fully charge the energy storage capacitor built into the RFID chip or externally connected to the RFID chip after the rectifier circuit and the regulator circuit in the RFID chip process the radio frequency signal. Thus, more energy is stored into the energy storage capacitor to satisfy the need for the high-precision temperature measurement and the A/D conversion of the temperature sensor. Although a charging operation includes the extended time charging radio frequency signal in an order of milliseconds, the extended time is still small for human perception, and the delay is ignorable. In some embodiments, the extended time charging radio frequency signal is about 10 milliseconds.

In order to store sufficient amount of electric energy, the capacitance of the energy storage capacitor and the voltage on the energy storage capacitor may have to be adjusted accordingly.

On one hand, a limiter circuit of the regulator circuit that limits the amplitude of the output voltage needs to relax its limit on the voltage amplitude. As such, the voltage across the energy storage capacitor may be increased to satisfy electric energy storage requirements. On the other hand, whether the voltage that the regulator circuit supplies to loads such as the "other RFID tag circuits" and the "temperature measurement and A/D conversion circuit" also needs to be increased depends on actual design requirements. In some designs, for the consideration of the measurement accuracy and the A/D conversion performance, the voltage of the power supply to certain circuits may be increased appropriately to achieve desired design results. In some other designs, for the consideration of the power consumption and the transistor reliability under different voltages, the voltage of the power supply to certain other circuits remains unchanged. The present disclosure does not limit the adjustment of the power supply voltage.

Further, after the energy storage capacitor circuit in the temperature sensor circuit is activated or waken up, the switch transistor Msensor enters a conducting state, such that the second energy storage capacitor Cs-sensor is added to the first energy storage capacitor Cs-tag. In this case, both the Cs-tag and the Cs-sensor are supplying power to the temperature measurement and A/D conversion circuit. After the temperature sensor completes its task, the switch transistor Msensor resumes a non-conducting state, and the second energy storage capacitor Cs-sensor is isolated from other circuits, such that the downlink command operation of the RFID tag in the RTF mode is unaffected.

The present disclosure also provides a method for improving energy harvesting by a passive RFID tag with an integrated temperature sensor. The method includes the following processes.

Firstly, a card reader sends a magnetic field to the passive RFID tag. An inductor coil of the passive RFID tag couples the magnetic field to generate an induced current, thereby powering up the passive RFID tag to enter an operation state.

Secondly, the card reader sends a command to the passive RFID tag. After a command demodulation circuit of the passive RFID tag parses the command, the control circuit for the RFID tag/sensor mode conversion controls relevant circuits to start the temperature sensor, and transmits relevant data upstream to the card reader. When the command sent by the card reader includes the command to start the temperature sensor, the control circuit for the RFID tag/sensor mode conversion switches to the temperature sensor mode, and outputs a voltage to the gate terminal of the switch transistor Msensor to make conduction between the source terminal and the drain terminal of the switch transistor Msensor. The electric charge outputted by the regulator circuit supplies to the other RFID tag circuits and the temperature measurement and A/D conversion circuit, and at the same time, charges the first energy storage capacitor Cs-tag and the second energy storage capacitor Cs-sensor.

Thirdly, when the card reader stops sending the magnetic field to the passive RFID tag, or the magnetic field sent by the card reader becomes weak, the first energy storage capacitor Cs-tag and the second energy storage capacitor Cs-sensor discharge to supply power to the other RFID tag circuits and the temperature measurement and A/D conversion circuit to keep them in the operation state to perform the temperature measurement, A/D conversion, and other tasks. Thus, the amount of electric charge is ensured for the RFID tag to perform the temperature measurement, the accuracy of the temperature measurement by the RFID tag is ensured, and a communication distance of the RFID tag is ensured.

The command sent downstream by the card reader to the passive RFID tag include three sub-parts. The first sub-part includes the command for the regular operation unrelated to the temperature sensor, which is configured to control the passive RFID tag to perform tasks other than the temperature measurement. The second sub-part includes the command for starting the temperature sensor by activating the temperature measurement and A/D conversion circuit in the passive RFID chip with the integrated temperature sensor. The modulation method and the coding method allow the radio frequency receiver circuit and the demodulation circuit to obtain the information in the command sent by the card reader for starting measuring the temperature, such that the RFID tag enters the temperature sensor mode (i.e., the high-precision high power consumption mode) for temperature sensing. The third sub-part includes an extended time radio frequency signal without modulated information. The main feature of the third sub-part is that the radio frequency signal includes a stabilized amplitude and a smooth envelope for a period of time. The objective is to fully charge the energy storage capacitor built into the RFID chip or externally connected to the RFID chip after the rectifier circuit and the regulator circuit in the passive RHD chip with the integrated temperature sensor process the radio frequency signal. Thus, more energy is stored into the energy storage capacitor to satisfy the need for the high-precision temperature measurement and the A/D conversion of the temperature sensor.

In the embodiments of the present disclosure, the passive RFID chip with the integrated temperature sensor includes the circuits to improve energy harvesting and the commands to improve the energy harvesting. However, the present disclosure is not limited to the integration of the RFID chip and the temperature sensor, can be extended to the integration of the passive RFID chip and any type of sensors, and can be even extended to accommodate the operation modes having substantially different power consumption levels of the passive RFID tag.

The present disclosure defines the temperature measurement operation in the passive RFID chip with the integrated temperature sensor as the operation in the downlink command mode while the operation in the uplink response mode only involves transmitting the fixed code stream upstream through the passive load modulation method and does not involve the advanced operations such as the temperature measure and the A/D conversion. Therefore, to achieve the accurate temperature measurement, the system architecture and the circuit design are improved. The objective is to provide more amount of electric energy to the passive RFID chip. The existing approach simply extends the card reader read/write time, which increases the amount of charge to the energy storage capacitor of the RFID chip through extending the time to transmit the magnetic field. However, extending the time to charge the RFID tag by the card reader may occupy too much of the time window in the power-on process, causing the RFID tag to automatically enter the uplink response mode and fail the RTF downlink command mode. The present disclosure can be extended to the integration of the passive RFID chip and other types of sensors requiring substantial power consumption, is a system level technology with tremendous potentials, and plays an important role in the lower power consumption IoT wireless sensor networking.

In one embodiment, the present disclosure provides a circuit and a method for improving energy harvest for an RFID tag with a temperature sensor, where an instruction command sent by a card reader includes a modulated part to invoke temperature sensor functions, and an unmodulated constant-envelop RF signal part with an extended time of duration to charge a switched second energy storage capacitor (e.g., a switched additional energy storage capacitor or an extra, ad-hoc switched capacitor) embedded in the circuit. Such switched second energy storage capacitor is connected to the circuit upon a mode control signal corresponding to the sensor operation mode of the RFID tag (e.g., including RFID transponder). Thus, the RFID tag (e.g., the RFID transponder IC) integrated with the temperature sensor is ensured to conform to the timing window protocol for regular downlink operations, and at the same time, is capable of meeting higher energy demand for a high accuracy temperature sensor operation. The present disclosure provides a new technique to integrate sensor circuits within the RFID tag (e.g., a passive RFID transponder IC).

The above-described embodiments are only some of the embodiments of the present disclosure, which should not be used to limit the scope of present disclosure. Therefore, equivalent changes made according to the claims of the present disclosure still fall within the scope of the present disclosure.

What is claimed is:

1. A circuit for a passive radio frequency identification (RFID) tag with a temperature sensor, comprising:
 a resonance inductor and a resonance capacitor connected in parallel for coupling an external magnetic field; a clock recovery circuit; a rectifier circuit; a regulator circuit; a command demodulation circuit; a load modulator circuit; a bandgap reference circuit; a power-on reset circuit; an embedded memory module; other RFID tag circuits including a state machine control circuit, an energy level detection and limiting control circuit, a mode conversion circuit, and a reference voltage and bias current circuit; and a first energy storage capacitor, wherein:
  a positive terminal and a negative terminal of the resonance capacitor are respectively connected to two input terminals of each of the clock recovery circuit, the rectifier circuit, the command demodulation circuit, and the load modulator circuit; an output terminal of the rectifier circuit is connected to an input terminal of the regulator circuit; and an output terminal of the regulator circuit is respectively connected to each of the bandgap reference circuit, the power-on reset circuit, the embedded memory module, the other RFID tag circuits, and the first energy storage capacitor;
 a control circuit for RFID tag/sensor mode conversion;
 a switch transistor, wherein:
  an output terminal of the command demodulation circuit is connected to the control circuit for the RFID tag/sensor mode conversion and is configured to demodulate information from an alternate current (AC) signal sent by a card reader to receive a command from the card reader, the command including a command for regular operations of an RFID chip under an RFID tag mode unrelated to the temperature sensor and a command for starting the temperature sensor under a temperature sensor mode sent by the card reader to the RFID tag that includes the temperature sensor;
  the control circuit for the RFID tag/sensor mode conversion is configured to control and configure the RFID tag according to the command from the card reader demodulated by the command demodulation circuit; and
  in response to the command containing the command for starting the temperature sensor, the control circuit for the RFID tag/sensor mode conversion enters the temperature sensor mode, and outputs a voltage to a gate terminal of a switch transistor to make conduction between a source terminal and a drain terminal of the switch transistor;
 a second energy storage capacitor; and
 a temperature measurement and A/D conversion circuit, wherein:
  the gate terminal of the switch transistor is connected to an output terminal of the control circuit for the RFID tag/sensor mode conversion;
  the drain terminal of the switch transistor is connected to the output terminal of the regulator circuit;
  the source terminal of the switch transistor is connected to the ground through the second energy storage capacitor; and
  the switch transistor is controlled by the control circuit for the RFID tag/sensor mode conversion to make conduction between the source terminal and the drain terminal to connect the second energy storage capacitor to form a circuit loop with the temperature measurement and A/D conversion circuit and the first energy storage capacitor.

2. The circuit according to claim 1, wherein:
 a positive terminal of the second energy storage capacitor is connected to the source terminal of the switch transistor;
 a negative terminal of the second energy storage capacitor is connected to the ground through the first energy storage capacitor; and
 the second energy storage capacitor is configured to supply power to the temperature measurement and A/D conversion circuit in the temperature sensor mode to allow the temperature measurement and A/D conversion circuit to accurately measure a temperature and to convert an analog temperature measurement to a digital temperature measurement with a high precision.

3. The circuit according to claim 2, wherein:
 one terminal of the temperature measurement and A/D conversion circuit is connected to the output terminal of the regulator circuit and the drain terminal of the switch transistor, and is connected to the second energy storage capacitor through the switching transistor;
 another terminal of the temperature measurement and A/D conversion circuit is respectively connected to each of an output terminal of the load modulator circuit and the embedded memory module; and
 the temperature measurement and A/D conversion circuit is configured to accurately measure the temperature according to the command from the card reader and to convert the measured temperature from analog to digital to form a digital code stream representing the temperature.

4. The circuit according to claim 3, wherein the command from the card reader includes:
 the command for the regular operations unrelated to the temperature sensor and configured to control the RFID tag to perform tasks other than temperature measurement;
 the command for starting the temperature sensor under the temperature sensor mode by activating the temperature measurement and A/D conversion circuit, wherein a modulation method and a coding method of the command allow a radio frequency receiver circuit and a demodulation circuit to obtain the information in the command sent by the card reader for starting measuring the temperature, such that the RFID tag enters the temperature sensor mode; and
 an extended time radio frequency signal without modulated information including a stabilized amplitude and a smooth envelope for a period of time, wherein after being processed by the rectifier circuit and the regulator circuit, the extended time radio frequency signal fully charges the first energy storage capacitor and the second energy storage capacitor, such that more amount of energy is stored into the first energy storage capacitor and the second energy storage capacitor to satisfy the need for the high-precision temperature measurement and A/D conversion of the temperature sensor.

5. The circuit according to claim 4, wherein:
the command from the card reader is on-off keying (OOK) modulated; or
the command from the card reader is frequency shift keying (FSK) modulated.

6. The circuit according to claim 4, wherein:
the extended time radio frequency signal is in an order of milliseconds.

7. The circuit according to claim 6, wherein:
the extended time radio frequency signal is about 10 milliseconds.

8. The circuit according to claim 3, wherein:
the first energy storage capacitor or the second energy storage capacitor is built into the RFID chip; or
the first energy storage capacitor or the second energy storage capacitor is externally connected to the RFID chip.

9. The circuit according to claim 3, wherein:
the switch transistor includes a switch device or a compound switch;
an input terminal of the switch transistor is connected to the output terminal of the regulator circuit;
an output terminal of the switch transistor is connected to the ground through the second energy storage capacitor; and
a control terminal of the switch transistor is connected to the output terminal of the RFID tag/sensor mode conversion control circuit.

10. The circuit according to claim 3, wherein:
the temperature sensor mode is a high power consumption mode and includes a card reader magnetic field off mode and a temperature measurement and A/D conversion mode.

11. A method for a passive radio frequency identification (RFID) tag with a temperature sensor, comprising:
sending, by a card reader, a magnetic field to the passive RFID tag, wherein an inductor coil of the passive RFID tag couples the magnetic field to generate an induced current to power up the passive RFID tag to enter an operation state;
sending, by the card reader, a command to the passive RFID tag, wherein after a command demodulation circuit of the passive RFID tag parses the command, a control circuit for the RFID tag/sensor mode conversion of the passive RFID tag controls relevant circuits of the passive RFID tag to start operation, and transmits relevant data upstream to the card reader; and when the command sent by the card reader includes a command to start the temperature sensor, the control circuit for the RFID tag/sensor mode conversion switches to a temperature sensor mode, and outputs a voltage to a gate terminal of a switch transistor to make conduction between a source terminal and a drain terminal of the switch transistor; an electric charge outputted by a regulator circuit of the passive RFID tag supplies to other RFID tag circuits, and a temperature measurement and A/D conversion circuit, and at the same time, charges a first energy storage capacitor and a second energy storage capacitor, the other RFID tag circuits including a state machine control circuit, an energy level detection and limiting control circuit, a mode conversion circuit, and a reference voltage and bias current circuit; and
when the card reader stops sending the magnetic field to the passive RFID tag, or the magnetic field sent by the card reader becomes weak, discharging, by the first energy storage capacitor and the second energy storage capacitor, to supply power to the other RFID tag circuits and the temperature measurement and A/D conversion circuit to keep them in the operation state to perform the temperature measurement, A/D conversion, and other tasks, such that the amount of electric charge is ensured for the RFD tag to perform the temperature measurement, the accuracy of the temperature measurement by the RFID tag is ensured, and a communication distance of the RFID tag is ensured.

12. The method according to claim 11, wherein the command from the card reader includes:
the command for regular operations of the RFID tag unrelated to the temperature sensor and configured to control the passive RFID tag to perform tasks other than temperature measurement;
the command for starting the temperature sensor by activating the temperature measurement and A/D conversion circuit, wherein a modulation method and a coding method of the command for starting the temperature sensor allow a radio frequency receiver circuit and the command demodulation circuit in the RFID tag to obtain the information in the command sent by the card reader for starting measuring a temperature, such that the RFID tag enters the temperature sensor mode; and
an extended time radio frequency signal without modulated information including a stabilized amplitude and a smooth envelope for a period of time, wherein after being processed by a rectifier circuit and a regulator circuit in the RFID tag, the extended time radio frequency signal fully charges the first energy storage capacitor and the second energy storage capacitor built into the RFID chip or externally connected to the RFID chip, such that more amount of energy is stored into the first energy storage capacitor and the second energy storage capacitor to satisfy the need for the temperature measurement and A/D conversion of the temperature sensor.

13. The method according to claim 12, wherein:
the command from the card reader is on-off keying (OOK) modulated; or
the command from the card reader is frequency shift keying (FSK) modulated.

14. The method according to claim 12, wherein:
the extended time radio frequency signal is in an order of milliseconds.

15. The method according to claim 14, wherein:
the extended time radio frequency signal is about 10 milliseconds.

16. The method according to claim 11, wherein the command from the card reader includes:
a read command configured to read data from a memory module in the RFID tag;
an erase command configured to erase data in the memory module in the RFID tag; and
a write command configured to write data into the memory module in the RFID tag.

* * * * *